Aug. 11, 1959 S. REINER 2,899,673
CODE WHEEL SHAFT POSITION ENCODER, RECORDER AND DECODER
Filed Aug. 26, 1953 3 Sheets-Sheet 1

INVENTOR
STEWART REINER

BY
ATTORNEY

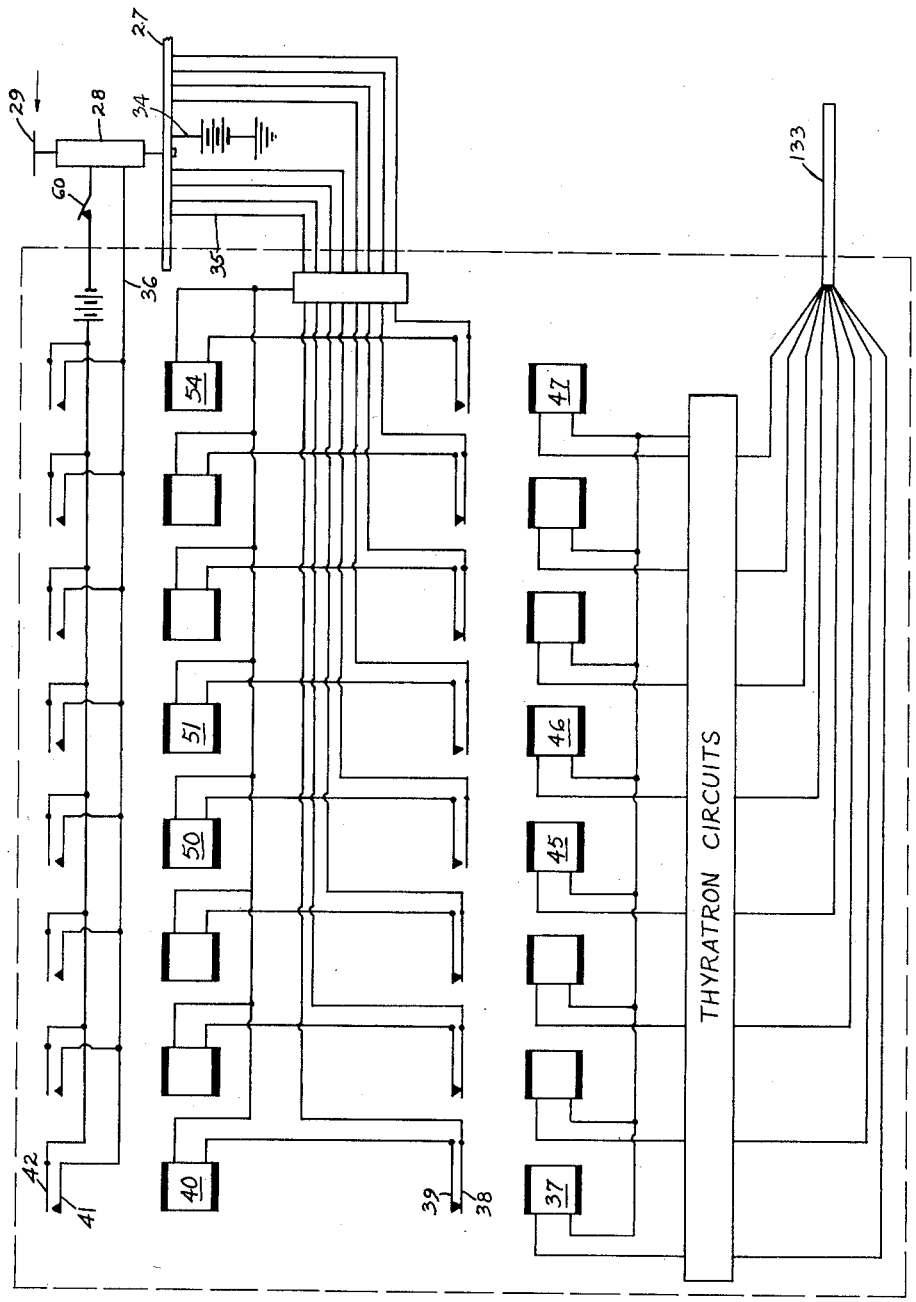

Aug. 11, 1959    S. REINER    2,899,673
CODE WHEEL SHAFT POSITION ENCODER, RECORDER AND DECODER
Filed Aug. 26, 1953    3 Sheets-Sheet 2
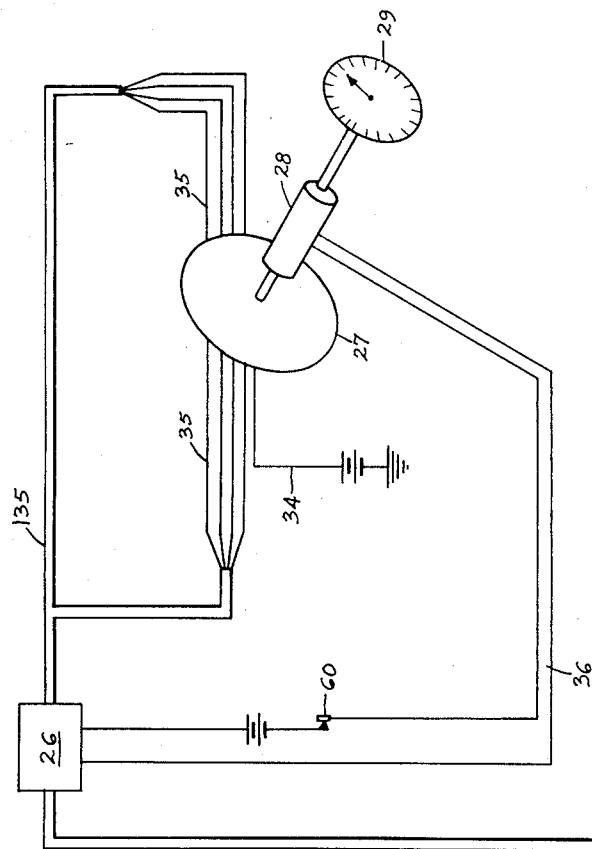
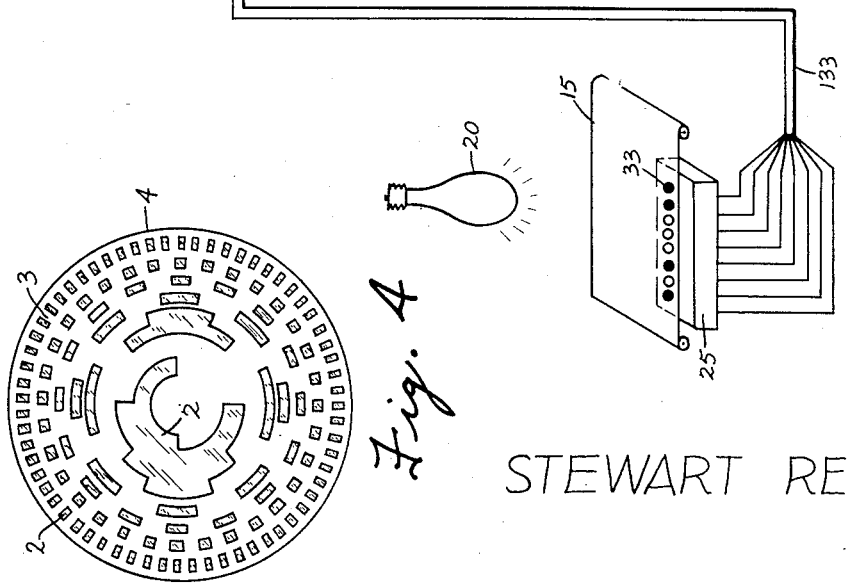
INVENTOR
STEWART REINER United States Patent Office 2,899,673
Patented Aug. 11, 1959

2,899,673

CODE WHEEL SHAFT POSITION ENCODER, RECORDER AND DECODER

Stewart Reiner, New Rochelle, N.Y., assignor, by mesne assignments, to the United States of America as represented by the Secretary of the Navy Application August 26, 1953, Serial No. 376,769

17 Claims. (Cl. 340—173)

The present invention relates, in general to apparatus for recording information and more particularly to the coding, recording and decoding of the angular movement of a shaft.

The angular position or angular displacement of a shaft can represent some value of measurement. The angular displacement of a shaft can represent a distance, an angular deviation of another object, an integral or a differential of an equation, an elevation, time of day and the like.

The information that appears in the form of a shaft rotation or angular deviation can be transmitted to various locations or stations in its original form of a shaft rotation, or the angular displacement can be converted to a discrete code and then transmitted to the required locations. Unfortunately there is a limit to the accuracy of information that is transmitted as a shaft rotation. The accuracy of said shaft rotation information containing system, commonly known as an analog system, is limited by small mechanical inaccuracies of parts, by noise, by difficulties in measurement, by inability to accurately read or differentiate between very small angular displacements of the shaft and the like.

By contrast, a digital system is unlimited in the accuracy that can be attained. A digital system comprises a converter that transforms a voltage or an angular displacement of a rotating shaft, into a number containing a predetermined number of decimal places. The number thus represents a definite angular position of a rotating shaft. The number can then be transmitted, recorded, decoded and then read without the introduction of errors or the loss of accuracy.

As mentioned above, the transformation of analog information into digital intelligence is accomplished by the utilization of converters. One of the most accurate and widely used type of converter that is in use today is the optical method. The optical method incorporates the use of a transparent coded disk that is connected directly to a rotating shaft. The transparent disk is sandwiched between a light source and a plurality of photoelectric cells. The disk contains transparent and opaque sections wherein the transparent sections designates a one and the opaque sections designates a zero. As the code wheel is revolved, the photoelectric cells transmits the angular position of the code wheel, in the form of a code comprising ones and zeros, to a counter or an indicating device.

The optical method has some major disadvantages such as the necessity for much auxiliary equipment. Also, the system is complicated, the code wheel must be transparent, the photoelectric cells must be continuously adjusted because of aging and, when the segments of the code wheel become very fine, extreme care must be exercised to prevent spurious results that are attributable to diffraction.

The present invention comprises a code wheel of non-conducting material containing segments of conducting material. Electrical brushes contact the code wheel and connect to a plurality of light bulbs that are in close proximity to a photographic film. A voltage pulse is periodically transmitted to the light bulbs that are connected to brushes that make contact with the conducting segments of the code wheel. The photographic film records the angular position of the code wheel in the form of a discrete code pattern of light and dark areas so that data which is recorded on the film at a known position relative to the code pattern can be identified by means of the recorded code pattern. The photographic film is then developed; the light and dark areas are scanned by means of photoelectric cells and converted, by means of a comparison device, to a reading that is proportional to the original angular deviation.

One object of the present invention is to make a permanent record of the angular position of a rotating shaft at some particular instant.

Another object of the present invention is to convert from an analog to a digital system by means of a non-transparent code wheel.

An additional object of the invention is the elimination of complicated and bulky auxiliary equipment.

A further object of the present invention is to provide a device that does not require constant or frequent adjustment.

A further object of the invention is to eliminate the possibility of spurious results.

Another object of the present invention is to convert the coded information to the actual angular deviation automatically.

Other objects and many of the attendant advantages of this invention will be readily appreciated as the same becomes better understood by reference to the following detailed description when considered in connection with the accompanying drawings wherein:

Fig. 2 is an illustration of the decoding system,

Fig. 3 is a schematic of a comparison device, and

Fig. 4 is a view of the code wheel face showing an illustrative portion of the conducting and non conducting segments.

Figure 1:
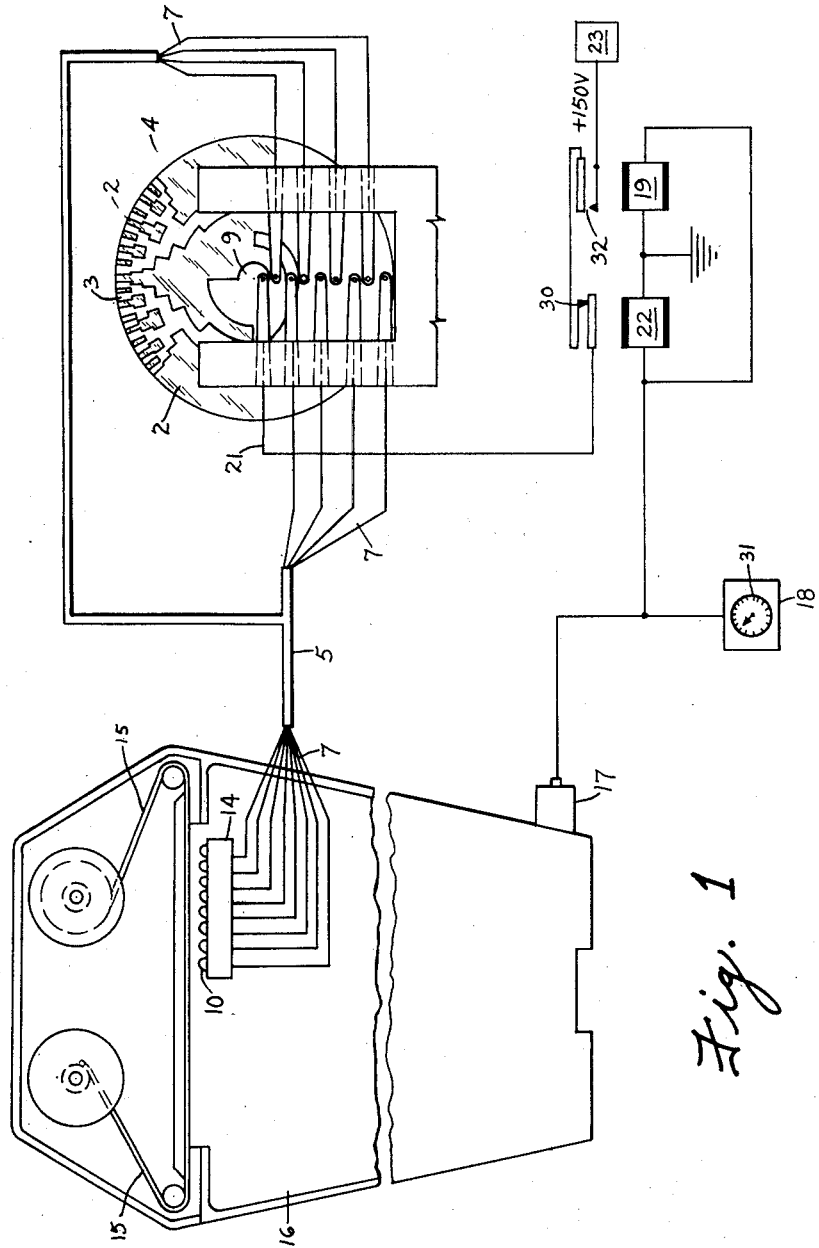
Fig. 1 illustrates the entire coding and recording system.

Referring now to the coding and recording system as illustrated in Fig. 1, a conventional single lens system, camera 16 is securely mounted to a convenient means that is not shown or illustrated. In the description of the present invention it shall be presumed that the mentioned camera 16 is installed within an aircraft and that the altitude of the camera must be known and recorded at each instant of exposure. Mounted within the camera 16 for reeling from one conventional spool to another is a film 15. Also mounted within the camera 16 and located in close proximity to the film 15 is a lamp mounting block 14. Said block 14 contains eight gas discharge lights, lamps or bulbs 10 that are arranged in an orderly pattern and mounted in a manner that will allow the light that is emitted from said bulbs to fall upon a marginal portion of the film 15. Each gas discharge bulb is connected to an assigned area of the code wheel 4 through a brush 7.

The electrical connections 5 between the brushes 7 and the gas discharge bulbs 10 are illustrated as a single conductor for convenience only. In reality, the number of connections 5 that are present between the electrical brushes 7 and the gas discharge bulbs 10 is equal to the number of gas discharge bulbs 10 that are present in the lamp mounting block 14. The code wheel 4 contains a pattern of conducting segments upon a non-conducting surface. The conducting segments are discretely arranged in the form of a prearranged code pattern.

Referring to Fig. 4, the areas 3 of the code wheel 4 are the conducting areas and the areas 2 are the non-conducting areas. The pattern that is illustrated in Fig. 4 represents the binary code in the form of a pattern.

Returning to Fig. 1, a common brush 21 continuously contacts a continuous segment or band of conducting material on the code wheel 4. As the code wheel 4 rotates, the common brush 21 is electrically connected to the various brushes 7 through the conducting portions 3 of the code wheel 4. The number of brushes 7 that are electrically connected to the common brush 21, at any particular instant, is dependant upon the pattern of conducting segments on the code wheel and the angular position of said code wheel. The common brush 21 is connected to the power supply 23 through the normally closed contacts 30 of the time delay relay 22 and the normally open contacts 32 of the relay 19. The power supply 23 has an output of one hundred and fifty volts D.C. Said power supply is of conventional design and construction and is well known to those that are familiar with the art. The coils of the normally closed time delay relay 22 and the normally open relay 19 are connected in parallel and are electrically connected to the output of an intervalometer 18. The intervalometer is a commercially available item that is on the market today. The dial 31 of the intervalometer is set to indicate some desired interval of time. The intervalometer will then deliver a D.C. voltage having an amplitude of twenty-four volts with a time duration of one second. This voltage pulse will have a frequency that is determined by the dial setting 31 of the intervalometer 18.

The output of the intervalometer is also connected to the shutter control mechanism 17 of the camera 16. The shutter control 17 is a commercially available device that cycles the shutter of the camera 16 each instant that the shutter control 17 receives a voltage pulse. Thus, the voltage output of the intervalometer is transmitted to the shutter control device 17 and, at the same instant, to the coils of the relays 22 and 19. The relay 22 is designed so that the contacts 30 remain closed for $\frac{1}{100}$ of a second before opening when a voltage pulse of 24 volts and having a time duration of one second is applied to the coil of relay 22. The normally open contacts 32 of the relay 19 close at the instant the twenty-four volts pulse is applied across said relay 19 and said contacts 32 open the instant the twenty-four volt pulse is removed from the relay 19. Therefore, the common brush 21 receives a voltage pulse of one hundred and fifty volts from the power supply 23, for a duration of $\frac{1}{100}$ of a second, through the operation of the contacts 30 and 32 at each instant the relays are cycled.

In the operation of the recording device as illustrated in Fig. 1, it shall be presumed that the camera 16 is an aerial camera and is mounted within an air frame to photograph the terrain below. It shall also be presumed that the altitude of the camera must be known and recorded at the instant of each exposure. The code wheel 4 is attached to some convenient altitude measuring device such as an altimeter that will convert height to angular displacement of the code wheel shaft. Thus the code wheel will rotate and assume a new angular position for each change in elevation. At the instant a photograph is taken, the following events occur. A voltage pulse of twenty-four volts and having a time duration of one second is emitted from the intervalometer 18 and is transmitted to the relays 22 and 19; and to the shutter control device 17.

The instant a voltage appears across the relay 19, the normally open contacts 32 close and a voltage of one hundred and fifty volts is transmitted to the common brush 21 from the power supply 23 through the contacts 32 and through the normally closed contacts 30 of the time delay relay 22. The time delay relay 22 opens its contacts $\frac{1}{100}$ of a second after a voltage appears across the time delay relay 22. Thus the common brush 21 receives a potential of one hundred and fifty volts for a time duration of $\frac{1}{100}$ of a second. This voltage pulse is transmitted through the common brush 21 to the common continuous segment of the code wheel 4, then to those brushes 7 that are in contact with the conducting segments of the code wheel 4 and then to the gas discharge bulbs 10 that are connected to the conducting brushes 7. A different combination of brushes 7 will contact the conducting segments of the code wheel 4 for each distinct angular position of said code wheel 4.

Therefore, the gas discharge bulbs 10 will ignite in some specific pattern, depending upon the angular position of the code wheel relative to the conducting brushes 7 to form a distinct pattern on the sensitized film 15. Thus the altitude of the camera appears on the film 15 in the form of light and dark areas that represent a discrete code. At the same instant that the gas discharge bulbs pass current, the shutter is cycled by the action of the 24 volt potential having a time duration of one second. Therefore, at each instant that a photograph is taken the altitude of the camera is permanently and accurately recorded on the film itself, in the form of a discrete code.

Referring to Fig. 2, therein is illustrated apparatus for automatically decoding the information that is on the film in the form of a discrete code. That portion of the film 15 that contains the coded intelligence is placed in close proximity to the mounting block 25. The mounting block 25 contains eight light sensitive elements 33 that have a center spacing that is equal to the center spacing of the gas discharge bulbs 10. Thus, the center spacing of the light and dark areas of the coded portion of the film 15 coincides with the center spacing of the light sensitive elements 33 that are contained within block 25. Each light sensitive element 33 is connected to a comparison device 26 through cable 133.

A second code wheel 27 is connected to one end of the armature of a motor 28. A dial 29 that is calibrated in feet is connected to the other end of the armature of the motor 28. The dial 29 is accurately attached to the motor 28 so that for each individual setting of the calibrated dial, the code wheel will indicate that setting in the form of a discrete code. The pattern on the code wheel 27 is identical to the pattern on the code wheel 4. Therefore the code pattern that is generated by the code wheel 27, for some particular setting or reading in feet of the dial 29, will be identical to the code pattern that is generated by the code wheel 4 when the camera 16 is at an elevation that corresponds to the reading of the dial indicator 29. A common brush 34 is connected to a voltage source and transmits said voltage to a plurality of eight contacts or brushes 35. These brushes engage the rear face of the disk 27 in a manner similar to engagement of brushes 7 with disk 4. The combination of brushes 35 that receive the voltage from the common brush 34 is determined by the angular position of the code wheel 27. The electrical connection between the common brush 34 and the brushes 35 is the same as the electrical connection between the common brush 21 and the brushes 7. The brushes 35 are connected to the comparison device 26. The control windings 36 of the motor 28 are also connected to the comparison device 26.

The apparatus illustrated in Fig. 2 automatically decodes the coded recorded information that is on the film 15. To determine the altitude of exposure of a photograph, the coded portion of the negative is placed between a light source 20 and the light sensitive elements 33. This code pattern is transmitted to the comparison device 26. The motor 28 revolves the code wheel 27 thus transmitting various code patterns to the comparison device 26. The instant that the code wheel 27 transmits to the comparison device a code pattern that is identical to the code pattern that is generated by the negative 15, the control windings of the motor 28 are opened and the altitude of exposure is read directly on dial 29.

Referring to Fig. 3, the comparison device consists of a plurality of relays and thyratron circuits. Each light sensitive cell 33 is connected to a separate normally closed, single pole single throw relay through a thyratron circuit. The thyratron circuits are necessary for the operation of the relays. The operation and construction of the thyratron circuits are of common knowledge to those that are experienced in the art. Therefore, the construction and operation of said thyratron circuit will not be discussed or explained. Referring to Fig. 3, an eight digit code is utilized. Therefore, eight relays are required. The contact 38 of the single pole single throw relay 37 is connected to the brush 35 through a thyratron circuit. The brush 35 that is connected to contact 38 occupies the same relative position on the code wheel 27 as the brush 7, that cooperated with and caused the relay 37 to operate, occupies on the code wheel 4. The contact 39 of the normally closed single pole single throw relay 37 is connected to the coil of a normally open single pole single throw relay. The other terminal of the coil of the relay 40 is connected to the return or to the ground of the thyratron circuit. The remaining normally closed relays are connected in the same fashion as the relay 37. The contacts 41 and 42 are connected in series with the control winding 36 of the motor 28 so that said motor 28 will not operate or rotate unless the contacts 41 and 42 make contact. The remaining normally open single pole single throw relays, that are similar to relay 40, are connected in the same manner as the relay 40.

The operation of the comparison device as illustrated in Fig. 3 is as follows: A discrete number of normally closed relays in the lower row are activated as determined by the code pattern on the film 15. Said film 15 cooperates with the light sensitive element 33. For illustrative purposes it shall be assumed that the code pattern of the film 15 causes relays 45, 46 and 47 to operate. Thus the coils of relays 50, 51 and 54 are opened and said relays 50, 51 and 54 cannot operate. The control circuit of the motor 28 is then closed by closing switch 60 and the motor 28 will start turning. As the code wheel 29 is rotated, various code patterns are generated on the brushes 35. Thus, those various normally open relays that were not inactivated by the action of the normally closed relays, are activated. As the normally open relays are activated, their contacts close and complete the control circuit. Therefore the motor will continuously revolve the code wheel 29 and generate every possible code pattern on the brushes 35. At the instant that a code pattern, that is identical to that pattern that is generated by the film 15, is generated by the code wheel 29, the control circuit 36 will open and the motor 28 will stop. The motor 28 stops when this condition occurs because the only relays that can possibly operate are relays 50, 51 and 54; but said relays cannot operate because of the action of the relays 45, 46 and 47. The elevation of exposure is then read directly in feet from dial 29.

Referring to Fig. 4, the code wheel 4 converts the variation of a variable to a digit of a discrete code. The pattern of conducting and non-conducting segments is in the form of the digital code, or the Bell Telephone Laboratory Gray code or any other convenient code. The total number of required digits of the chosen code depends upon the accuracy desired. In the illustration above, the desired range of altitudes to be used is arbitrarily divided into an equal number of values.

The finer the unit or divisions of the range of altitudes, the greater the accuracy. Each unit or division is then assigned to a number. Thus, each number represents an increment of altitude, the range of each increment being determined by the original division. The code wheel is divided into the required number of sectors where each sector represents a number. The number that is represented by each sector on the code wheel is in the form of a pattern of the code selected. Therefore, the number of sectors on the code wheel will increase as the accuracy increases.

The present invention is not restricted to the aerial photography or the recording of a single channel containing eight digits. This invention may be used with any type of camera that is large enough to accommodate the gas discharge lamps. The number of channels and the number of digits of each channel is limited by the physical size of the film only. The present invention may be used to record weather conditions, wind velocity, speed, altitude, roll, pitch and the like.

The ignition of gas tubes which contain no emitting cathodes (in which class the neon lamps used in the recording system fall) depends upon the gas being in a state of slight natural ionization that is due to the effects of ambient cosmic rays, X-rays, ultraviolet rays or photoelectric emission from electrodes within the tube when irradiated by ambient light. Therefore, if intermittent operation of the recording lamps is noted, it can be attributed to a lack of ionization present during the $\frac{1}{100}$ second interval when the lamps are pulsed after being in the darkness of the camera for long periods.

In order to provide the lamps with an abundance of natural ionization so that ignition should take place reliably in the dark in the $\frac{1}{100}$ second interval during which the lamps are fired, a catalyst consisting of a small spot of radium base phosphorescent paint was affixed to the bulb of each lamp. The paint used was Undark—U.S. Radium Corporation, Grade 38M, (38$\mu$ lamberts), Spec. T Tr-58.

Obviously many modifications and variations of the present invention are possible in the light of the above teachings. It is therefore to be understood that within the scope of the appended claims the invention may be practiced otherwise than as specifically described.

What is claimed is:

1. A system of the character described comprising a camera containing photographic film, a multiple light means located within said camera and in close proximity to the film to form a combination of exposed and non-exposed areas on a portion of the film, said combination constituting an identificatory marking for other recorded data on said film, coding means actuating said light means to determine the combination of said light means that pass current, voltage pulse means fed through said coding means to send a voltage pulse through the coding means to selected lights of said light means at the instant of exposure of the film, and means to automatically decode said coded information on the film.

2. The combination of claim 1 wherein said light means comprises gas discharge lights.

3. A system of the character described comprising a camera having a shutter and containing photographic film, a multiple light means located within close proximity to the film, to form a combination of exposed and non-exposed areas on a portion of the film, said combination constituting an identificatory marking for other recorded data on said film, a rotatable code wheel containing a plurality of conducting and non-conducting segments coupled selectively with said light means to determine the combination of lights that will pass current, voltage pulse means coupled to said coding means and linked to the shutter to send a voltage pulse through the coding means to the selected light means at the instant of exposure of the film, and means to automatically decode said coded information on the film.

4. A system of the character described comprising a camera containing photographic film, a plurality of lights located within close proximity to the film to expose a certain area of said film, a rotatable code wheel containing a plurality of conducting and non-conducting segments, a means to rotate said wheel to couple selected segments to said plurality of lights to determine the combination of lights that will pass current, said combination of lights acting to record a coded image on said film which identifies other recorded data thereon, relays coupled to said code wheel to pass a voltage pulse through said code wheel to selected lights at the instant of exposure and means to automatically decode said film representation of coded information.

5. A system of the character described comprising a camera containing photographic film, a plurality of lights located within close proximity to the film to expose a certain area of said film, a rotatable code wheel containing a plurality of conducting and non-conducting segments, a means to rotate said wheel to couple selected segments to said plurality of lights to determine the combination of lights that will pass current, said combination of lights acting to record a coded image on said film which identifies other recorded data thereon, relays coupled to said code wheel to pass a voltage pulse through said selected segments to said selected lights at the instant of exposure and means to automatically decode said film representation of coded information comprising a scanning means to read the coded information on the exposed area of the film, comparison means connected to said scanning means, a second code wheel connected to said comparison means, and means for rotating said second wheel, said rotating means being controlled by said comparison means.

6. The combination of claim 5 wherein said scanning means comprises a plurality of light sensitive elements.

7. The combination of claim 5 wherein said comparison means comprises a plurality of cooperating relays.

8. The combination of claim 5 wherein said wheel rotating means comprises a motor.

9. The combination of claim 5 wherein said indicating means comprises a calibrated dial.

10. A system of the character described comprising a camera containing photographic film, a plurality of lamps located within close proximity to a small portion of said film, so that the film will be exposed in the area immediate to a lamp when said lamp lights, a plurality of brushes connected to the plurality of lamps, a code wheel containing electrical conducting and non-conducting areas for contact by said plurality of brushes, rotatable means connected to said code wheel to rotate said wheel thus converting angular position of the wheel to a digit of a discrete code, a common brush connected to said code wheel, a plurality of contacts of a plurality of relays connected to said common brush, a voltage source connected to said common brush through a normally open contact and a normally closed contact of a plurality of relays, a second voltage source connected to said plurality of relays to actuate the contacts of said plurality of relays simultaneously, said plurality of relays operating once each instant that a picture is taken.

11. A device for recording coded information on a photographic film comprising a camera containing photographic film, a plurality of gas discharge lights located within said camera and adjacent to said film to generate a discrete pattern on said film, ionization triggering means adjacent to said gas discharge lights to catalyze ionization within said lights, and means coupled to said lights to determine the pattern of illuminated lights.

12. A device for recording coded information on a photographic film comprising a camera containing photographic film, a plurality of gas discharge lights located within said camera and adjacent to said film to generate a discrete pattern on said film, radium base phosphorescent material adjacent to said gas discharge lights to catalyze ionization within said lights and a code wheel coupled to said lights to determine the pattern of illuminated lights.

13. A device for recording coded information on a photographic film comprising a camera containing photographic film, a plurality of gas discharge lights located within said camera and adjacent to said film to generate a discrete pattern on said film, ionization means coupled to said gas discharge lights to catalyze ionization within said bulbs, and a code wheel coupled to said lights to determine the pattern of illuminated lights.

14. A comparison device for comparing a signal containing a coded group of signal elements with a code pattern on a code wheel comprising, in combination: a plurality of relay-actuating devices, each connected to receive and be actuated by a different signal element in said signal; a plurality of first relays, each having a coil connected to be actuated by a different one of said relay-actuating devices and having a set of contacts; a code wheel bearing a plurality of conductive segments arranged to form a plurality of different code patterns, each pattern occupying a specific sector on said code wheel; a plurality of second relays, each having a coil and a set of contacts; brush means connected to each conductive segment in any single code pattern and to said first relay contacts; motor means to rotate said code wheel; and connections for a source of electrical energy, said connections being linked with said conductive segments, said brush means, said first relay contacts and said second relay coils so that contact of said brush means with a given conductive segment permits current to flow through its associated first relay contacts and second relay coil, and said connections also being in circuit with said motor means and said second relay contacts so that flow of current through any one of said second relay coils operates said motor means, whereby reception of a coded signal by said relay-actuating devices acts to rotate said motor means until a corresponding code pattern on said code wheel comes into contact with said brush means whereupon rotation of said code wheel ceases.

15. A device as set forth in claim 14, including a dial rotated by said motor means and calibrated to give a direct indication of the code.

16. A comparison device for comparing a signal containing a coded group of signal elements with a code pattern on a code wheel comprising, in combination: a plurality of unidirectional current devices, each connected to receive and be actuated by a different signal element in said signal; a plurality of first relays, each having a coil connected to be actuated by a different one of said unidirectional current devices and having a set of contacts; a code wheel bearing a plurality of conductive segments arranged to form a plurality of different code patterns, each pattern occupying a specific sector on said code wheel; a plurality of second relays, each having a coil and a set of contacts; brush means connected to each conductive segment in any single code pattern and to said first relay contacts; motor means to rotate said code wheel; and connections for a source of electrical energy, said connections being linked with said conductive segments, said brush means, said first relay contacts and said second relay coils so that contact of said brush means with a given conductive segment permits current to flow through its associated first relay contacts and second relay coil, and said connections also being in circuit with said motor means and said second relay contacts so that flow of current through any one of said second relay coils operates said motor means, whereby reception of a coded signal by said unidirectional current devices acts to rotate said motor means until a corresponding code pattern on said code wheel comes into contact with said brush means whereupon rotation of said code wheel ceases.

17. Apparatus for coding information recorded on an information-storage strip in accordance with the angular position of a shaft comprising, in combination: a shaft; a circular member affixed to said shaft, said member adapted to effectively subdivide the circumference of said shaft into sections and to uniquely designate each said section in accordance with a predetermined digital designation system, said member bearing conductive commutating segments arranged in a different pattern for each said shaft section, each different pattern corresponding to a different number in a binary number code; means for deriving from said member information designating the particular section whose position corresponds with a predetermined reference position, said derivation means including a plurality of brush members for contacting said conductive segments and a source of electrical energy, said conductive segments, brushes and energy source arranged in circuit to provide electrical signals corresponding to the binary number designating said particular shaft section; and means for recording said designating information on said information-storage strip which comprises a photographic film and said recording means comprises a plurality of lamps to which said electrical signals are applied so that said plurality of lamps light up in a pattern corresponding to the binary number designating said particular shaft section, said lamps being placed in proximity to said film so that said film is photographically exposed to the light from said lamps.

References Cited in the file of this patent

UNITED STATES PATENTS

| | | |
|---|---|---|
| 2,124,906 | Bryce | July 26, 1938 |
| 2,397,604 | Hartley | Apr. 2, 1946 |
| 2,425,122 | Petty | Aug. 5, 1947 |
| 2,482,242 | Brustman | Sept. 20, 1949 |
| 2,533,242 | Gridley | Dec. 12, 1950 |
| 2,590,110 | Lippel | Mar. 25, 1952 |
| 2,594,358 | Shaw | Apr. 29, 1952 |
| 2,714,841 | Demer et al. | Aug. 9, 1955 |
| 2,720,642 | Blakely | Oct. 11, 1955 |
| 2,822,130 | Nolde et al. | Feb. 4, 1958 |